Patented Nov. 23, 1926.

1,608,148

UNITED STATES PATENT OFFICE.

CURRY O. WALPER, OF DETROIT, MICHIGAN, ASSIGNOR TO STANDARD PLASTERING SYSTEM, INC., OF DETROIT, MICHIGAN, A CORPORATION OF MICHIGAN.

WALL PLASTER.

No Drawing.   Application filed March 15, 1926. Serial No. 94,798.

This invention relates to plaster compositions for the coating of walls and similar surfaces wherein it has been usual to add certain ingredients for the purpose of facilitating the application and working thereof, and in order to overcome objections to the use of plaster of Paris exclusively or more or less exclusively as a plaster.

As is well known plaster of Paris or gypsum when mixed with water to produce a plastic mass capable of being spread upon a wall requires speed and dexterity in its application, due to its quick setting properties, and ordinarily such a plastic mass presents the difficulty especially when applied to vertical walls that prior to setting it has a marked tendency to flow on the structure to which it is applied due to the lack of internal support in the material itself. Consequently, great limitations are imposed upon the amount of water which may be admixed with the plaster of Paris and on the time which may be expended in the spreading of the plastic material, and, furthermore, due to the quick setting nature of the said plaster of Paris, only small quantities may be prepared at a time for use so that where a surface of any considerable extent is to be covered the frequent mixing of the material called for adds to the difficulty of securing a uniform coating throughout the work. For other reasons well known to those versed in the art to which this invention appertains, this quick setting feature is usually very undesirable.

It should be noted that the common method of using plaster of Paris or gypsum in a wall coating is to grind it to a fine powder before mixing with the water, and to overcome the objections to the resultant mixture of powdered plaster of Paris and water to some extent, it has been a general practice to admix sand therewith in suitable proportion to give a body to the mass which will make it easier to handle with the trowel and which will form an internal support in the mass overcoming its tendency to flow when applied to the work, the sand also tending to slow the setting qualities of the material according to the proportion of sand utilized therein. In such case the plaster of Paris forms a binder for the sand and the means by which the mass is caused to adhere to the work.

By my invention I overcome the aforesaid objections in a very simple manner by merely adopting a different physical form of the plaster of Paris or gypsum to be mixed with the water. Instead of grinding the plaster of Paris to a fine powder, as has hitherto been the practice, I find it much better to utilize it in a substantially coarser form wherein the plaster of Paris or gypsum may be ground to the fineness of sand or even of a still coarser form than ordinary sand, the ground grains of the plaster of Paris having also intermingling therewith, as a result of the grinding or as a deliberate addition thereto, a percentage of finely powdered plaster of Paris, the predominating feature of the material however being the coarse grains referred to.

When this is mixed with water in the usual manner the powdered portion of the plaster of Paris gives the requisite consistency to the resultant plastic mass to allow a spreading of the material on the work and to provide the adhesive properties therein, and the larger particles give to the mass a body or internal support which enables it to stand up on the work in a desirable manner, even though there may be a greater proportion of water in the material than would be feasible in an ordinary mixture of plaster of Paris and water in which some form of body material has not been incorporated.

Still further, the larger particles of the plaster of Paris are slower to absorb the moisture of the mixture in the manner peculiar to that substance so that the hardening process is therefore delayed in its action and the restrictions as to time imposed upon a workman in applying the mixture to the work considerably alleviated. The coarse grains of the plaster of Paris take the place of the sand usually used, but form in the plaster upon setting a homogeneous part thereof.

It will be apparent to those well versed in the plastering art, that the improvement although simple in itself is a very marked digression from standard practice, and by its means, much heavier coats of plaster of Paris may be applied to work when desired without the difficulties and failures which normally attend attempts to apply such coats to work, and the necessity for the building up of foundations of other materials or the incorporation in the plaster of Paris coating of often undesirable foreign materials is in a large number of cases rendered unnecessary.

Herein and in the appended claims, the term "plaster of Paris" is deemed to be interchangeable with the term "gypsum" in so far as the relative properties thereof admit.

It will be understood that the invention does not preclude the addition of other materials such as coloring matter or of sand for the obtaining of special surfaces or appearance, but lies in the obtaining of the results herein specified by the utilizing of coarsely ground or crushed plaster of Paris or gypsum as described.

What I claim is:—

1. A wall plaster resulting from the admixture with water of coarsely ground plaster of Paris together with a desirable percentage of finely powdered plaster of Paris, the coarsely-ground component having a temporary body content characteristic in the admixture during the application of the admixture, whereby a permanent body content in the admixture may be reduced or eliminated.

2. Plaster of Paris prepared for admixture with water to form a wall plaster and characterized by the presence therein of a predominant amount of coarsely ground grains, adapted to be active as a temporary body factor during the application of the plaster.

3. A plastic material for walls, wherein the principal body forming factor is coarsely ground plaster of Paris and the principal adhesive agent is finely ground plaster of Paris, said coarsely ground plaster of Paris being temporarily active as a body factor and adding its adhesive properties to that of the finely ground plaster to form a uniformly adhesive substance.

In testimony whereof I affix my signature.

CURRY O. WALPER.